US011102445B1

(12) United States Patent
Engelkemier et al.

(10) Patent No.: US 11,102,445 B1
(45) Date of Patent: Aug. 24, 2021

(54) EXTENDING SUPPORT OF AUDIO VIDEO TRANSPORT PROTOCOL BY DATA ENCAPSULATION

(71) Applicant: Ethernovia Inc., San Jose, CA (US)

(72) Inventors: Darren S. Engelkemier, Menlo Park, CA (US); Poon-Kuen Leung, Fremont, CA (US); Roy T. Myers, Jr., Santa Clara, CA (US); Hossein Sedarat, San Jose, CA (US); Ramin Shirani, Morgan Hill, CA (US)

(73) Assignee: Ethernovia Inc., San Jose, CA (US)

( * ) Notice: Subject to any disclaimer, the term of this patent is extended or adjusted under 35 U.S.C. 154(b) by 0 days.

(21) Appl. No.: 16/816,601

(22) Filed: Mar. 12, 2020

Related U.S. Application Data

(60) Provisional application No. 62/817,321, filed on Mar. 12, 2019.

(51) Int. Cl.
*H04N 7/18* (2006.01)
*H04N 7/025* (2006.01)
*H04N 7/01* (2006.01)

(52) U.S. Cl.
CPC ............. *H04N 7/025* (2013.01); *H04N 7/01* (2013.01); *H04N 7/18* (2013.01)

(58) Field of Classification Search
CPC .......... B65H 2301/331; B65H 23/0204; B65H 23/032; B65H 2511/413; B65H 2701/1242; B65H 2701/1315; B65H 2701/192; B65H 2553/42; H04N 7/025; H04N 7/01; H04N 7/18
USPC ........................................................ 348/148
See application file for complete search history.

(56) References Cited

U.S. PATENT DOCUMENTS

| | | | |
|---|---|---|---|
| 2012/0314713 A1* | 12/2012 | Singh ............... | H04N 21/43615 370/401 |
| 2017/0366430 A1* | 12/2017 | Seo ........................ | H04L 43/106 |
| 2018/0081854 A1* | 3/2018 | Joy ......................... | G06F 13/28 |
| 2018/0145848 A1* | 5/2018 | Seo ....................... | H04N 21/632 |
| 2018/0191588 A1* | 7/2018 | Kuemmel ............. | H04L 43/062 |
| 2019/0268444 A1* | 8/2019 | Mardmoeller ........ | H04L 45/741 |

\* cited by examiner

*Primary Examiner* — Gims S Philippe
(74) *Attorney, Agent, or Firm* — Schwegman Lundberg & Woessner, P.A.

(57) ABSTRACT

Various embodiments provide for using data encapsulation to extend support of an Audio Video Transport Protocol (AVTP) standard, which can be used in such applications as data network communications between sensors (e.g., cameras, motion, radar, etc.) and computing equipment within vehicles (e.g., smart and autonomous cars).

20 Claims, 7 Drawing Sheets

EXTENDING SUPPORT OF AUDIO VIDEO TRANSPORT PROTOCOL BY DATA ENCAPSULATION

CROSS-REFERENCE TO RELATED APPLICATION

This application claims priority to and the benefit of U.S. Provisional Patent Application No. 62/817,321, filed on Mar. 12, 2019, which is incorporated herein by reference.

TECHNICAL FIELD

Embodiments described herein relate to data communications and, more particularly, to systems, methods, devices, and instructions for extending support of an Audio Video Transport Protocol (AVTP) standard by data encapsulation.

BACKGROUND

The Audio Video Transport Protocol (AVTP) standard as defined by IEEE 1722 inherently provides support for mapping raw and compressed video data of different formats for communication using an Ethernet physical layer standard. Though AVTP can also define mappings of data of other protocols (e.g., automotive protocols, such as FlexRay, Control Area Network (CAN), and Local Interconnect Network (LIN)) for communication using Ethernet, AVTP still lacks support for mapping data of certain useful formats/standards/protocols. For instance, AVTP currently lacks support for mapping a Mobile Industry Processor Interface (MIPI) Camera Serial Interface (CSI) standard (e.g., MIPI CSI-2 or MIPI CSI-3) over Ethernet. At present, MIPI CSI-2 is used in various automotive applications, where MIPI CSI-2 data is typically outputted by car camera sensors and may be communicated using low-voltage differential signaling (LVDS). However, as cameras and other sensors (e.g., within automotive applications) produce more data bandwidth, communication over low bandwidth (and proprietary) protocols such as LVDS can be insufficient, and higher bandwidth protocols such as Ethernet are needed to carry sensor data like MIPI CSI-2 data. Unfortunately, the lack of explicit support of MIPI CSI-2 data (and data of other data formats/standards/protocols) by AVTP makes it challenge for Ethernet to carry such data.

BRIEF DESCRIPTION OF THE DRAWINGS

Various ones of the appended drawings merely illustrate example embodiments of the present disclosure and should not be considered as limiting its scope.

DETAILED DESCRIPTION

Various embodiments provide for extending support of an Audio Video Transport Protocol (AVTP) standard by data encapsulation, which can be used in such applications as data network communications between sensors (e.g., cameras, motion, radar, etc.) and computing elements (e.g., electronic control units (ECUs), central processing units (CPUs), and graphic processing units (GPUs)) within vehicles (e.g., smart and autonomous cars). In particular, some embodiments provide for extending support of an AVTP standard to data standards or protocols (hereafter, generically referred to as data standard) not explicitly mapped by an AVTP standard (e.g., not currently mapped by an IEEE 1722 standard). In doing so, data packets of a data standard (e.g., data standard not supported by an AVTP standard) can be carried by AVTP data packets from one media access control (MAC) device to another, each of which may be part of a larger device (e.g., sensor device or a computing device within a vehicle). Depending on the embodiment, AVTP subtypes (AVTP data packet subtypes) used can include, without limitation, a Vendor Specific Format (VSF) subtype or a Serial Data Interface (SDI) Video Format (SVF) subtype. For a data packet defined by a given data standard (e.g., one not currently supported by an AVTP standard, such as MIPI CSI-2 or Inter-Integrated Circuit (I2C)), various embodiments can encapsulate data from the data packet into one or more AVTP data packets by mapping data from one or more fields of the data packet (fields defined by the given data standard) to fields of the one or more AVTP Ethernet data packets (hereafter, AVTP data packets), where the fields of the one or more AVTP data packets are defined based on the selected AVTP subtype (e.g., VSF or SVF). In doing so, data (e.g., information) from the data packet can be encapsulated in predefined fields (e.g., VSF or SVF fields) of the one or more AVTP data packets and reserved data space within a payload portion of the one or more AVTP data packets. The data encapsulated in the one or more AVTP data packets can be sufficient for the data packet to be recreated (e.g., reconstructed) by a device receiving the one or more AVTP data packets.

As an example, various embodiments can extend support of an AVTP standard such that MIPI CSI data (e.g., MIPI CSI-2 data or MIPI CSI-3 data) can be encapsulated into AVTP data packets. For instance, various embodiments can extend AVTP to support and implement a transparent MIPI CSI data pipe (e.g., between two communication devices) over Layer 2. Such embodiments use one or more pre-defined fields (e.g., in AVTP common stream data header of an AVTP data packet of Vendor Specific Format (VSF) subtype) of an AVTP data packet. In the AVTP common stream data header, when the subtype of the AVTP data packet is set to VSF subtype, the one or more pre-defined fields used can include, without limitation: subtype (which will be set to VSF subtype in this case); tv (which indicates whether avtp_timestamp is valid); sequence_num (stream packet sequence number, which increments on each packet sent within a given stream_id); stream_id; avtp_timestamp; or stream_data_length (which indicates the payload length for the AVTP data packet). For example, the stream_id can be set to a media access control (MAC) address of a device plus a unique ID. For instance, where the AVTP data packet is encapsulating MIPI CSI-2 data, the stream_ID could be set to the MAC address of the source device providing the MIPI CSI-2 data, and the unique ID could comprise a virtual channel (e.g., 16-bit unique ID comprising the virtual channel from the original MIPI CSI-2 data packet (including extended virtual channel 4 bits D-PHY or 5 bits C-PHY) and a data type field from the original MIPI CSI-2 data packet). Additionally, some embodiments define one or more additional data fields, relevant for carrying MIPI CSI data from one physical layer device to another, as one or more bits or bytes (e.g., additional header bytes) stored in a payload portion of the AVTP data packet (e.g., stored in stream data payload of an AVTP data packet of Vendor Specific Format (VSF) subtype). The one or more additional data fields can include one field that specifies that the AVTP data packet is encapsulating, and therefore carrying, MIPI CSI data (e.g., MIPI CSI-2 or MIPI CSI-3 data). Additionally, the one or more additional data fields can include fields that store data needed to recreate and synchronize data frames of MIPI CSI data at a receiving device (e.g., reconstruct MIPI CSI-2 data stream), such as: (a) start frame (e.g., start of transmission); (b) end frame (e.g., end of transmission); (c) frame count; (d) line start; (e) line end; (f) line number; or (g) fragment information (e.g., fragment number, last fragment, or valid fragment). Depending on the embodiment, the frame start, frame end, line start, and line end can be communicated through traditional vertical and horizontal sync indicators. Additionally, for some embodiments, the fragment information facilitates segmentation and reassembly of MIPI CSI data packets (e.g., MIPI CSI-2 data packets). For instance, fragments can be created if the MIPI CSI-2 data packet is larger than the payload Protocol Data Unit (PDU) used by the AVTP data packet. Accordingly, various embodiments enable an AVTP data packet to carry MIPI CSI-2 short and long data packets fragmented by Ethernet PDU size.

As another example, various embodiments can extend support of an AVTP standard such that control data (e.g., control protocol data, such as Inter-Integrated Circuit (I2C) or MIPI I3C (I3C) data) can be encapsulated into AVTP data packets. For some embodiments, such control data is used to provide control information to a sensor. For instance, the control data can comprise Camera Control Format (CCI) data used to control a camera sensor, such as a car camera sensor. As described herein, various embodiments use one or more pre-defined fields (e.g., in AVTP common stream data header of an AVTP data packet of Vendor Specific Format (VSF) subtype) of an AVTP data packet. In the AVTP common stream data header, when the subtype of the AVTP data packet is set to VSF subtype, the one or more pre-defined fields used can include, without limitation: subtype (which will be set to VSF subtype in this case); tv (which indicates whether avtp_timestamp valid); sequence_num (stream packet sequence number, which increments on each packet sent within a given stream_id); stream_id; avtp_timestamp; or stream_data_length (which indicates the payload length for the AVTP data packet). Additionally, some embodiments define one or more additional data fields, relevant for carrying control data from one physical layer device to another, as one or more bits or bytes (e.g., additional header bytes) stored in a payload portion of the AVTP data packet (e.g., stored in stream data payload of an AVTP data packet of Vendor Specific Format (VSF) subtype). With respect to I2C data, the one or more additional data fields can include one data field that specifies that the AVTP data packet is encapsulating, and therefore carrying, I2C data. Additionally, with respect to I2C data, the one or more additional data fields can include, without limitation, fields that store data relating to: (a) device address; (b) memory address; (c) command type (e.g., read, write, and acknowledgement); (d) command length; or (e) error or interrupt (e.g., which can include type, count, or severity).

By various embodiments described herein, predefined fields and payload portions of an AVTP data packet can be used to encapsulate and (transparently) carry data (e.g., video data or control data) associated with a data standard not presently supported by an AVTP standard (e.g., IEEE 1722), such as a MIPI CSI-2 or a I2C standard. In doing so, various embodiments enable a first physical layer device to use one or more AVTP data packets to transparently carry data of a non-supported data standard (e.g., data from a data packet of a non-supported data standard) to a second physical layer device, which can decapsulate the encapsulated data. Additionally, the second physical layer device can recreate a data packet of the non-supported data standard, which can help in avoiding interoperability/compatibility issues (e.g., receiving device expecting to receive data according to the non-supported data can continue to do so while using an embodiment described).

Though various embodiments are described herein with respect to using VSF subtype AVTP data packets (e.g., to communicate MIPI CSI data or I2C data), some embodiments can use an alternative subtype, such as a Serial Data Interface (SDI) Video Format (SVF) subtype or a Raw Video Format (RVF) subtype, to encapsulate and communicate data of unsupported data standards through AVTP data packets. Additionally, though various embodiments are described herein with respect to using AVTP data packets to encapsulate (and carry) data relating to MIPI CSI, I2C, and I3C, some embodiments permit support of other data standards (e.g., future data standards) that have yet to be supported by an AVTP standard (e.g., IEEE 1722).

As used herein, vendor specific format can refer to the Vendor Specific Format (VSF) subtype (also referred to as VSF_STREAM subtype) defined by IEEE 1722, where the VSF subtype permits a vendor to define and use proprietary stream formats without causing interoperability issues with AVTP streams defined elsewhere in the IEEE 1722 standard.

As used herein, a data standard can comprise a data standard or data protocol, such as a MIPI CSI standard, a I2C standard, or a I3C standard. As used herein, a MIPI CSI standard can generally refer to a MIPI CSI-1 standard, a MIPI CSI-2 standard, a MIPI CSI-3 standard, or another version of the MIPI CSI standard (e.g., a future version). As used herein, a I2C standard can generally refer to any version of the I2C standard. As used herein, a I3C standard can generally refer to any version of the I3C standard. Additionally, as used herein, an AVTP standard can generally refer to any version of the AVTP standard.

Reference will now be made in detail to embodiments of the present disclosure, examples of which are illustrated in the appended drawings. The present disclosure may, however, be embodied in many different forms and should not be construed as being limited to the embodiments set forth herein.

Figure 1:
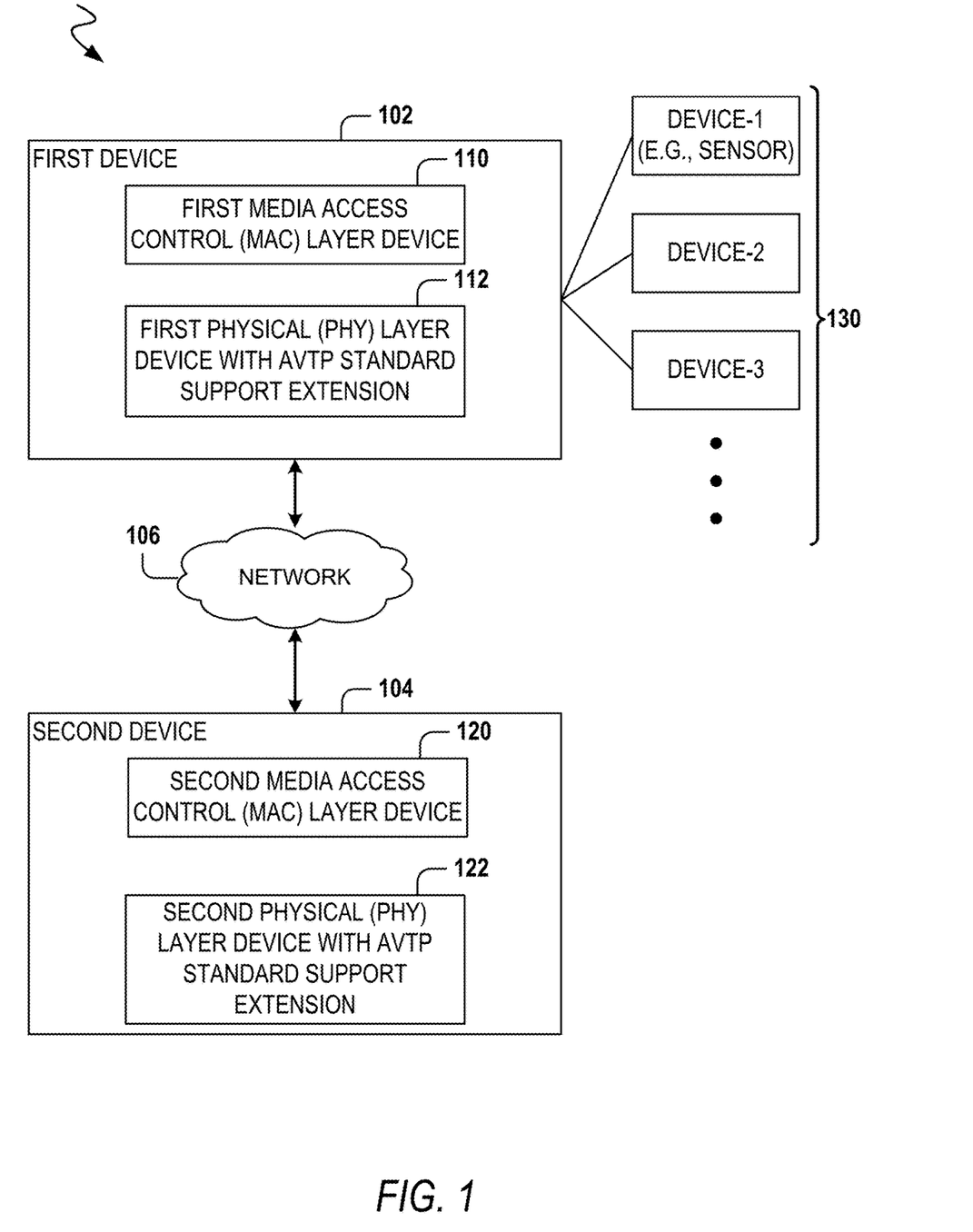
FIG. 1 is a block diagram illustrating an example system comprises a first device and a second device that can use data encapsulation to extend support of an Audio Video Transport Protocol (AVTP) standard, in accordance with some embodiments.

FIG. 1 is a block diagram illustrating an example system 100 comprises a first device 102 and a second device 104 that can use data encapsulation to extend support of an Audio Video Transport Protocol (AVTP) standard, in accordance with some embodiments. Depending on the embodiment, the first device 102 can be implemented (at least in part) by machine 700 of FIG. 7, and the second device 104 can be implemented (at least in part) by machine 700 of FIG. 7. As shown, a network 106 communicatively couples the first device 102 to the second device 104 (and possibly to other devices not shown), where the network 106 can support communication of one or more AVTP data packets over an Ethernet data link. The network 106 can comprise any form of communication network including, for example, local area networks, wide-area networks, Wi-Fi® networks, the Internet, and the like. One or both of the first and second devices 102, 104 can be coupled to the network 106 via a wire (e.g., twisted pair) that permits transmission of an analog signal. As also shown, the first device 102 comprises a first media access control (MAC) layer device 110, and a first physical (PHY) layer device 112 with AVTP standard support extension as described herein, and the second device 104 comprises a second media access control (MAC) layer device 120, and a second physical (PHY) layer device 122 with AVTP standard support extension as described herein.

Each of the first physical layer device 112 and the second physical layer device 122 can implement features or methodologies described herein with respect to various embodiments. The first media access control (MAC) layer device 110 represents one or more components of the first device 102 that implement or enable a MAC layer of a network stack of the first device 102, and the first physical (PHY) layer device 112 represents one or more components of the first device 102 that implement or enable a PHY layer of a network stack of the first device 102. The second media access control (MAC) layer device 120 represents one or more components of the second device 104 that implement or enable a MAC layer of a network stack of the second device 104, and the second physical (PHY) layer device 122 represents one or more components of the second device 104 that implement or enable a PHY layer of a network stack of the second device 104.

As illustrated, the first device 102 can be communicatively coupled to one or more other devices 130 (e.g., device-1, device-2, device-3, etc.) that generate or otherwise provide the first device 102 with data packets in a data standard, such as a data standard not currently supported by an AVTP standard (e.g., a MIPI CSI-2 standard). Depending on the embodiment, the devices 130 can comprise one or more sensors or other peripheral devices that generate or provide data packets according to a data standard. For instance, at least one of the devices 130 can comprise a car camera sensor that generates MIPI CSI-2 data packets. According to some embodiments, a first data packet according to a given data standard (e.g., a MIPI CSI-2 standard) is received by the first device 102 from one of the devices 130, the first physical layer device 112 of the first device 102 encapsulates the first data packet into one or more AVTP data packets, and the one or more AVTP data packets are communicated (e.g., transmitted) to the second device 104 over the network 106. For some embodiments, the second device 104 receives the one or more AVTP data packets from the first device 102, and the second physical layer device 122 of the second device 104 generates a second data packet based on the one or more AVTP data packets, where the second data packet represents the first data packet as decapsulated (e.g., reconstructed) from the one or more AVTP data packets. Subsequently, the second data packet generated at the second device 104 can be processed by a processor that is part of, or operatively coupled to, the second device 104. The processor can include, without limitation, an electronic control unit (ECU), a central processing unit (CPU), or a graphic processing units (GPU) (e.g., one adapted to process MIPI CSI-2 data packets).

Figure 2:
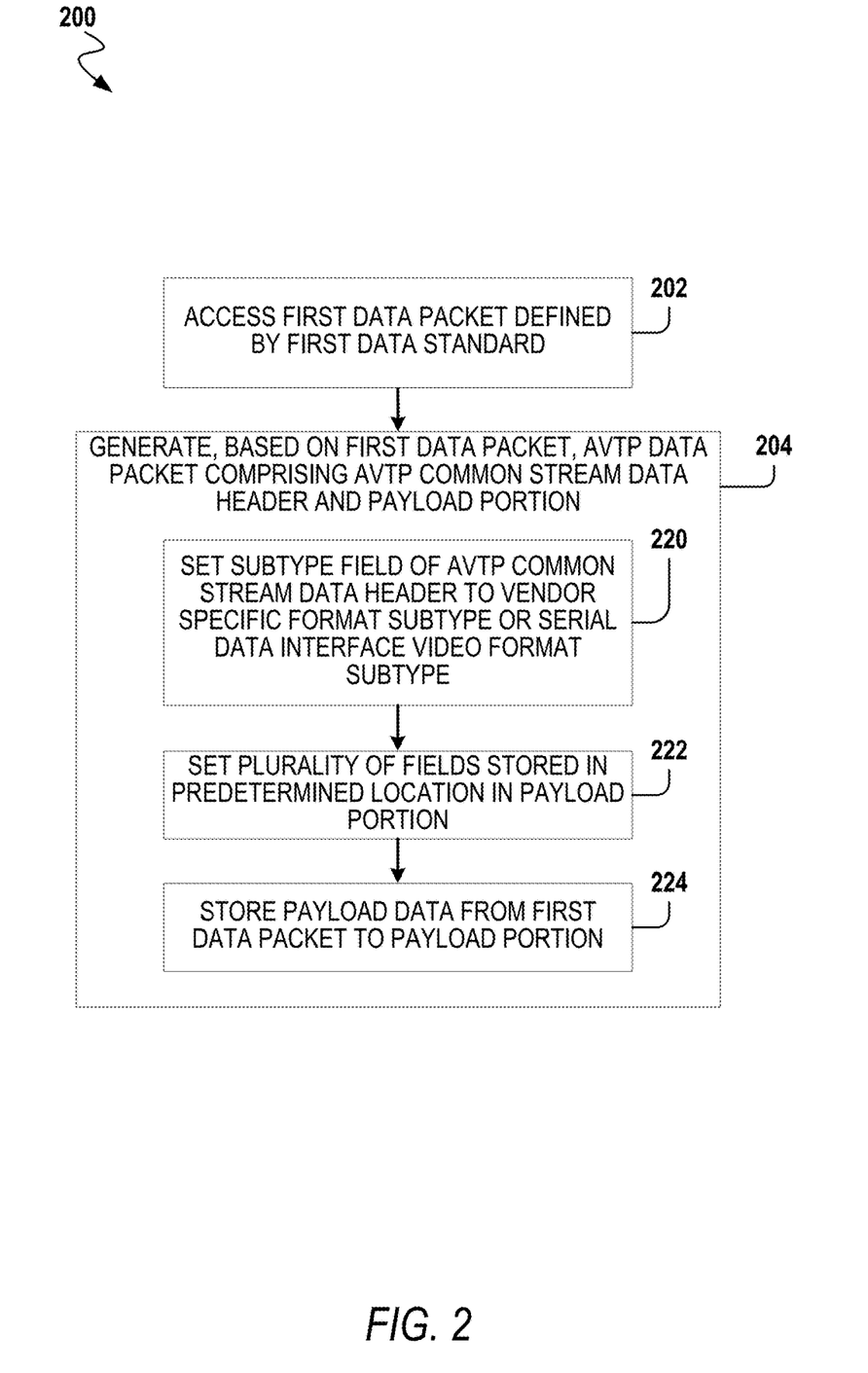
FIGS. 2 through 4 are flowcharts illustrating example methods for using data encapsulation to extend support of an AVTP standard, in accordance with some embodiments.
Figure 3:
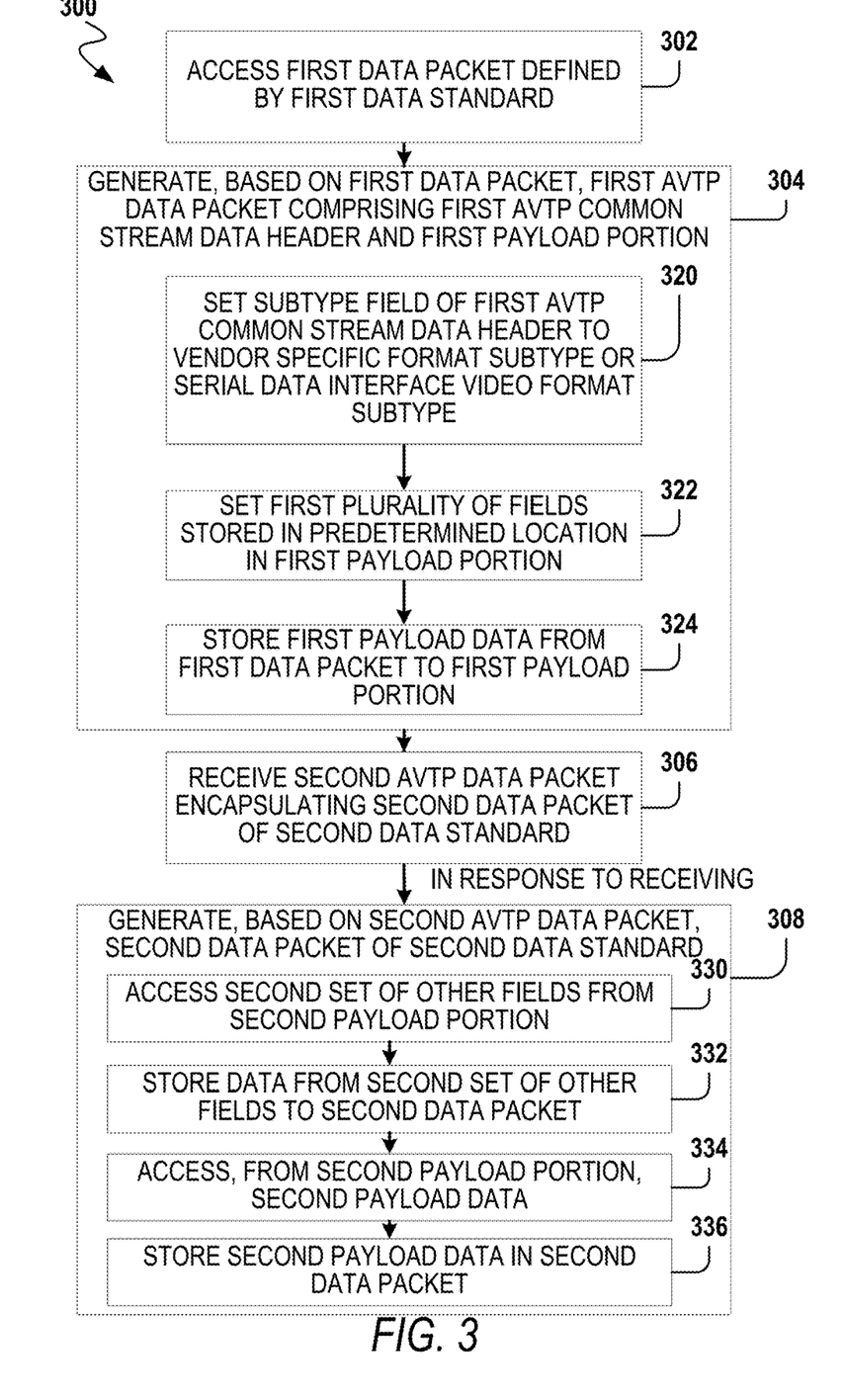
Figure 4:
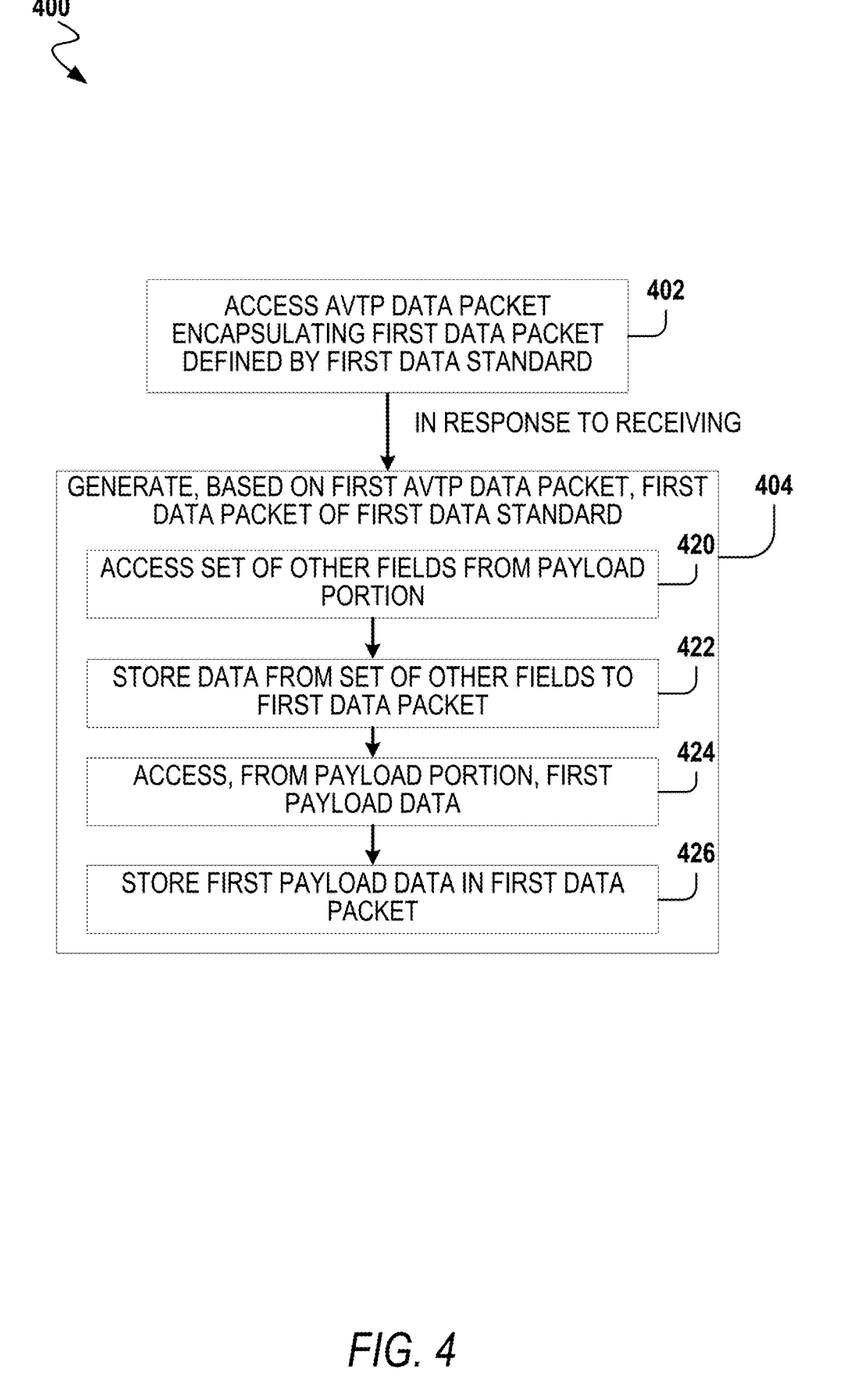

FIGS. 2 through 4 are flowcharts illustrating example methods 200, 300, 400 for using data encapsulation to extend support of an Audio Video Transport Protocol (AVTP) standard, in accordance with some embodiments. It will be understood that example methods described herein may be performed by various hardware components. For instance, the methods 200, 300, 400 may be performed by the first physical (PHY) layer device 112 described with respect to FIG. 1. Depending on the embodiment, an operation of an example method described herein may involve intervening operations not shown. Additionally, though the operations of example methods may be depicted and described in a certain order, the order in which the operations are performed may vary among embodiments, including performing certain operations in parallel.

Referring now to FIG. 2, at operation 202, a first physical layer device (e.g., 112) accesses a first data packet defined by (e.g., according to) a first data standard, such as a MIPI CSI-2 standard or a I2C standard. For some embodiments, the first data packet can be generated within a device (e.g., 102) that includes the first physical layer device, such as a higher layer device or component in a network stack of the device (e.g., application layer). For example, the device can be a sensor, such as a car camera sensor, that natively generates data as a one or more data packets of the first data standard, which may not be currently supported by an AVTP standard (e.g., MIPI CSI-2 or I2C standard). An example data packet in accordance with a MIPI CSI-2 standard can include data relating to: virtual channel (e.g., 2 bits); extended virtual channel (e.g., 2 bits for D-PHY; 3 bits for C-PHY); data type (e.g., 6 bits, which can designate a YUV, a RGB, or a RAW data type); word count (e.g., 16 bits); payload data. According to various embodiments, the first physical layer device receives the first data packet from a higher layer in a network stack, such as an application layer.

The method 200 continues with operation 204, where the first physical layer device generates, based on the first data packet, an AVTP data packet (e.g., AVTP PDU) that comprises an AVTP common stream data header and a payload portion (e.g., stream data payload or video data payload based on the selected AVTP subtype). For some embodiments, generating the AVTP data packet comprises mapping the first data packet to the AVTP data packet. As shown, performing operation 204 comprises performing operations 220 through 224. For various embodiments, operations 220 through 224 execute the mapping of the first data packet to the AVTP data packet.

At operation 220, the first physical layer device sets a subtype field of the AVTP common stream data header to a vendor specific format subtype (e.g., VSF as defined by IEEE 1722) or a Serial Data Interface video format (e.g., SVF as defined by IEEE 1722). Where the subtype field is set to the vendor specific format subtype, the payload portion can comprise a stream data payload portion associated with the vendor specific format subtype. Where the subtype field is set to the Serial Data Interface video format subtype, the payload portion can comprise a video data payload portion associated with the Serial Data Interface video format subtype.

At operation 222, the first physical layer device sets a plurality of fields stored at a predetermined location in the payload portion of the AVTP data packet. The predetermined location can comprise, for example, the start of the payload portion. Depending on the embodiment, storage of the plurality of fields in the payload portion of the AVTP data packet can comprise a reserved amount of data space at a predetermined location of the payload portion. For example, the reserved data space can comprise twelve bytes (e.g., twelve additional header bytes) of space. According to some embodiments, the reserved amount of space is sufficient to store one or more of following information from a MIPI CSI-2 data packet: frame count (e.g., 16 bits); first packet of frame (e.g., 1 bit); last packet of frame (e.g., 1 bit), which can also be calculated based on line number and last sequence of line; line number (e.g., 16 bits); intra line sequence (e.g., fragment number) number (e.g., 8 bits); sequence valid (e.g., 1 bit, to indicate whether the fragment is valid); and last sequence of line (e.g., 1 bit), which can be calculated based on stream data length.

For various embodiments, the setting the plurality of fields (stored in the payload portion of the AVTP data packet) comprises: setting an indicator field (in the plurality of fields) to specify that data of the first data standard (e.g., a MIPI CSI-2, MIPI CSI-3, I2C, or I3C standard) is being encapsulated (e.g., carried) by the AVTP data packet. Accordingly, the indicator field can indicate the specific data standard the AVTP data packet is carrying. The indicator field can be considered user specified header information stored within the payload of the AVTP data packet. Depending on the embodiment, the indicator field can be specified by any number of bits or bytes.

Additionally, for some embodiments, the setting the plurality of fields (stored in the payload portion of the AVTP data packet) comprises: setting a set of other fields (in the plurality of fields) based on data from at least one field from the first data packet, where the at least one field is defined by (e.g., according to) the first data standard (e.g., MIPI CSI-2 or I2C standard). For example, where the first data standard comprises a MIPI CSI standard, the set of other fields can comprise at least one of: a start frame field; an end frame field; a frame count field; a line start field; line end field; a line number field; or a fragment information field. As another example, where the first data standard comprises an I2C standard, the set of other fields can comprise at least one of: a device address field; a memory address field; a command type field; command length field; or error or interrupt field. According to some embodiments, the set of other fields helps facilitate the recreation of the first data packet by the second physical layer device upon receipt of the AVTP data packet. For some embodiments, the set of other fields is stored after the indicator field in the payload portion of the AVTP data packet.

Though not illustrated, for some embodiments, where the first data standard comprises a MIPI CSI standard and the subtype of the AVTP data packet is set to a vendor specific format subtype or a Serial Data Interface video format subtype, operation 204 further comprises setting a stream identifier field in the AVTP common stream data header such that the stream identifier field comprises a media access control (MAC) address associated with the first physical layer device and a unique identifier. The unique identifier can comprise a virtual channel data and data type data, where the virtual channel data and the data type data are from the first data packet. For example, the unique identifier can comprise a 16-bit unique ID made up of a Virtual Channel (VC) and a Virtual Channel Extension (VCX) (e.g., extended virtual channel 4-bit D-PHY or 5-bit C-PHY) from the first data packet and a data type (e.g., 6 bits) from the first data packet.

For some embodiments, where the first data standard comprises a MIPI CSI standard and the subtype of the AVTP data packet is set to a vendor specific format subtype, operation 204 further comprises setting one or more of the following fields (e.g., fields predefined according to the vendor specific format subtype) in the AVTP common stream data header as follows: a stream identifier with a stream identifier value; a stream identifier valid field with a valid value; a sequence number field with a sequence number associated with the stream identifier value; an timestamp field; a timestamp valid field with a valid value; and a stream data length field based on the first indicator field, the first plurality of fields, and the first payload data stored in the first payload portion of the first AVTP data packet.

For some embodiments, where the first data standard comprises a MIPI CSI standard and the subtype of the AVTP data packet is set to a Serial Data Interface video format subtype, operation 204 further comprises setting one or more of the following fields (e.g., fields predefined according to the vendor specific format subtype) in the AVTP common stream data header as follows: an end frame field based on frame end data from the first data packet; an intra-line sequence number based on line start data from the first data packet; a line number field to specify a current video frame; and a stream data length field to a fixed size based on the first indicator field, the first plurality of fields, and the first payload data stored in the first payload portion of the first AVTP data packet. Additionally, where the subtype of the AVTP data packet is set to a Serial Data Interface video format subtype, operation 204 can comprise setting a format field in the first AVTP common stream data header to a value associated with SVF USER. In doing so, various embodiment can avoid having to use a predefined common raster structure of a Serial Data Interface video format subtype (the fields of which would need to be set to avoid an IEEE 1722 violation).

At operation 224, the first physical layer device stores first payload data (e.g., video data for MIPI CSI-2 standard or control data for I2C standard, such as Camera Control Format (CCI) data) from the first data packet to the payload portion of the AVTP data packet. For some embodiments, the payload data (from the first data packet) is stored after the first plurality of fields in the payload portion of the AVTP data packet.

Eventually, the generated AVTP data packet by operation 204 can be transmitted to the second physical layer device. In doing so, the first data packet of the first data standard (e.g., data standard not currently supported by the AVTP standard) can be transparently communicated from the first physical layer device to the second physical layer device using the AVTP standard as extended according to an embodiment described herein. The first physical layer device can facilitate the transmission of the AVTP data packet by providing the AVTP packet to the first physical layer device (e.g., 112).

Though not illustrated, the first physical layer device of various embodiments can receive a request to reconfigure the first physical layer device such that the first physical layer device: foregoes the generating the first AVTP data packet based on the first data packet (e.g., operation 204); and generates the first AVTP data packet by setting the AVTP data packet to a subtype corresponding to the first data standard, and by mapping data from one or more fields of the first data packet to one or more fields of the first AVTP data packet (e.g., fields defined by the subtype corresponding to the first data standard). By receiving and processing this request, the first physical layer device has the capability to forego the solution provided (for mapping a data standard not supported by an AVTP standard to an AVTP data packet) when a standards body (e.g., standards body of an AVTP standard) later defines an AVTP subtype that explicitly supports the unsupported data standard (e.g., defines a subtype for MIPI CSI-2 or I2C).

Referring now to FIG. 3, the method 300 illustrates using data encapsulation to extend support of an AVTP standard to facilitate sending and receiving data packets between two physical layer devices, in accordance with some embodiments. For some embodiments, operations 302 and 304 are respectively similar to operations 202 and 204 of the method 200 described above with respect to FIG. 2.

At operation 306, the first physical layer device receives a second AVTP data packet (originating from a second physical layer device) that encapsulates a second data packet as described herein, where the second AVTP data packet comprises a second AVTP common stream data header and a second payload portion. Depending on an embodiment, a subtype field of the second AVTP common stream data header can be set to a vendor specific format subtype or a Serial Digital Interface video format subtype. According to some embodiments, the second payload portion comprises a second plurality of fields that is stored at a predetermined location in the second payload portion. Additionally, for some embodiments, the second plurality of fields comprises a second indicator field to specify that data of a second data standard is being encapsulated (e.g., carried) by the second AVTP data packet.

In response to receiving the second AVTP data packet, at operation 308, the first physical layer device generate, based on the second AVTP data packet, a second data packet of the second data standard (e.g., generate a data packet of a MIPI CSI-2 standard or a I2C standard). As shown, performing operation 308 comprises performing operations 330 through 336. By operation 308, various embodiments can effectively recreate (e.g., reconstruct or remap) the original data packet that the second physical layer device had encapsulated in the second AVTP data packet. For various embodiments, operations 330 through 336 execute a mapping of the second AVTP data packet to the second data packet.

At operation 330, the first physical layer device accesses, from the second payload portion, a second set of other fields that store information relating to the second data standard. Subsequently, at operation 332, the first physical layer device stores data from the second set of other fields to the second data packet. For various embodiments, the second set of other fields comprises one or more fields defined by the second data standard (e.g., MIPI CSI or I2C standard). For example, where the second data standard comprises a MIPI CSI standard, the second set of other fields can comprise at least one of: a start frame field; an end frame field; a frame count field; a line start field; line end field; a line number field; or a fragment information field. As another example, where the second data standard comprises an I2C standard, the set of other fields can comprise at least one of: a device address field; a memory address field; a command type field; command length field; or error or interrupt field. According to some embodiments, the second set of other fields helps facilitate the recreation of the second data packet by the second physical layer device upon receipt of the second AVTP data packet.

At operation 334, the first physical layer device accesses, from the second payload portion, second payload data (e.g., video data for MIPI CSI-2 standard or control data for I2C standard, such as Camera Control Format (CCI) data) for the second data packet. Subsequently, at operation 336, the first physical layer device stores the second payload data in the second data packet.

Though not illustrated, the operation 308 can further comprise operations to access data from one or more fields of the AVTP common stream data header of the second AVTP data packet (e.g., predefined fields associated with a vendor specific format subtype or a Serial Data Interface video format subtype). Such data can also be used in generating the second data packet (e.g., setting certain fields of the second data packet) at operation 308. For instance, where the second data standard comprises a MIPI CSI standard and the subtype of the second AVTP data packet is set to a vendor specific format subtype, the first physical layer device can access data from one or more of the following fields in the AVTP common stream data header of the second AVTP data packet: a stream identifier field; a stream identifier valid field; a sequence number field; an timestamp field; a timestamp valid field; and a stream data length field. In another instance, where the second data standard comprises a MIPI CSI standard and the subtype of the second AVTP data packet is set to a Serial Data Interface video format subtype, the first physical layer device can access data from one or more of the following fields in the AVTP common stream data header of the second AVTP data packet: an end frame field; an intra-line sequence number; a line number field; and a stream data length field.

Referring now to FIG. 4, the method 400 illustrates using data encapsulation to extend support of an AVTP standard with respect to an AVTP data packet received by one physical layer device from another physical layer device, in accordance with some embodiments. At operation 402, a first physical layer device (e.g., 112) accesses an AVTP data packet that encapsulates a first data packet defined by a first data standard, such as a MIPI CSI-2 standard or a I2C standard. For some embodiments, the AVTP data packet can be received by a device (e.g., 102) that includes the first physical layer device, such as a lower layer device or component in a network stack of the device (e.g., the first MAC layer device 110). For some embodiments, operation 404 is similar to operation 308 of the method 300 described above with respect to FIG. 3.

Figure 5:
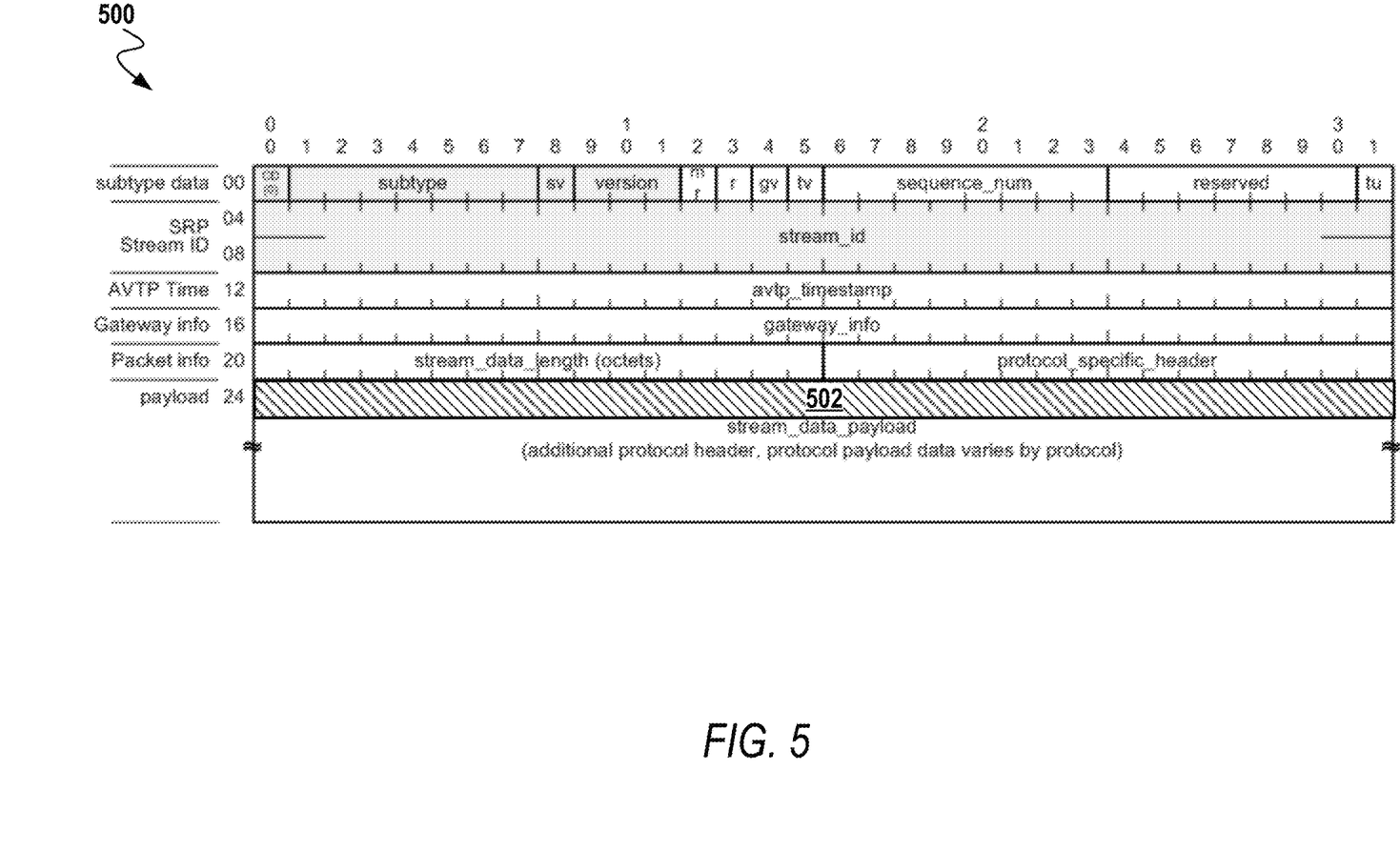
FIG. 5 illustrates an example structure of an AVTP data packet of a vendor specific format subtype that can be used by various embodiments.

FIG. 5 illustrates an example structure 500 of an Audio Video Transport Protocol (AVTP) data packet of a vendor specific format subtype that can be used by various embodiments. As shown, the example structure 500 includes a portion 502 (e.g., twelve bytes of space) of the stream data payload, which according to some embodiments can be used (as described herein) to store a plurality of fields (e.g., additional header fields) for data from one or more fields of a data packet of a data standard (e.g., data standard not currently supported by an AVTP standard).

Figure 6:
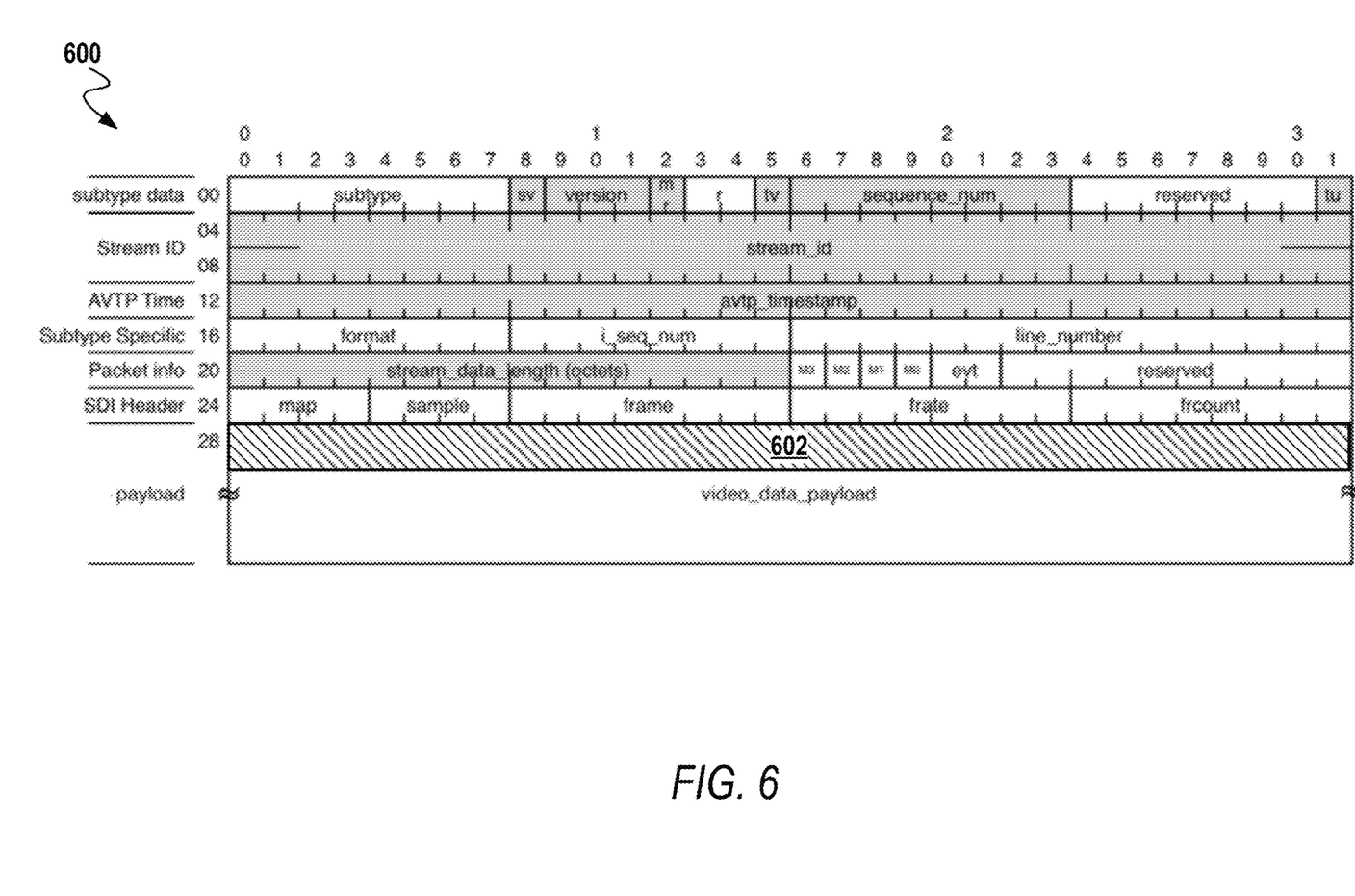
FIG. 6 illustrates an example structure of an AVTP data packet of a Serial Data Interface video format subtype that can be used by various embodiments.

FIG. 6 illustrates an example structure 600 of an Audio Video Transport Protocol (AVTP) data packet of a Serial Data Interface video format subtype that can be used by various embodiments. As shown, the example structure 600 includes a portion 602 (e.g., twelve bytes of space) of the video data payload, which according to some embodiments can be used (as described herein) to store a plurality of fields (e.g., additional header fields) for data from one or more fields of a data packet of a data standard (e.g., data standard not currently supported by an AVTP standard).

Figure 7:
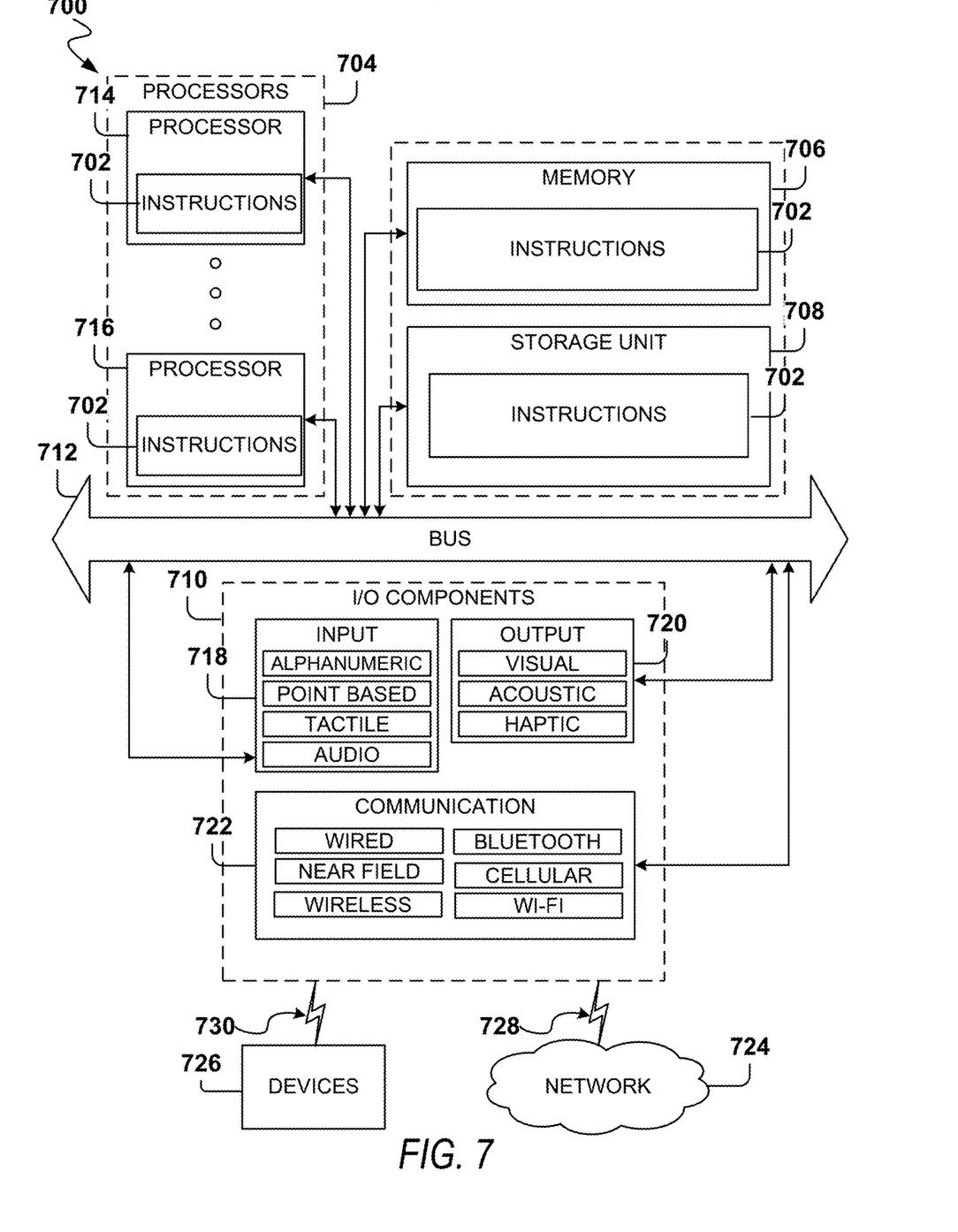
FIG. 7 is a block diagram illustrating components of an example machine that can use one or more embodiments discussed herein.

FIG. 7 is a block diagram illustrating components of an example machine 700 that can use one or more embodiments discussed herein. Specifically, FIG. 7 shows a diagrammatic representation of the machine 700 in the example form of a system, within which instructions 702 (e.g., software, a program, an application, an applet, an app, a driver, or other executable code) for causing the machine 700 to perform one or more operations that may make use of one or more of the methodologies discussed herein. For example, the instructions 702 include executable code that causes the machine 700 to execute one or more operations that cause a physical (PHY) layer device of the machine 700 (e.g., embodied by communication components 722) to perform the method 200, 300, or 400. The machine 700 may be coupled (e.g., networked) to other machines. Depending on the embodiment, the machine 700 can implement at least some portion of the first device 102 or the second device 104.

By way of non-limiting example, the machine 700 may comprise or correspond to a television, a computer (e.g., a server computer, a client computer, a personal computer (PC), a tablet computer, a laptop computer, or a netbook), a personal digital assistant (PDA), a smart phone, a mobile device, or any machine capable of executing the instructions 702, sequentially or otherwise, that specify actions to be taken by the machine 700. Further, while only a single machine 700 is illustrated, the term "machine" shall also be taken to include a collection of machines 700 that individually or jointly execute the instructions 702.

The machine 700 may include processors 704, memory 706, a storage unit 708, and I/O components 710, which may be configured to communicate with each other such as via a bus 712. In some embodiments, the processors 704 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 714 and a processor 716 that may execute the instructions 702. The term "processor" is intended to include multi-core processors 704 that may comprise two or more independent processors (sometimes referred to as "cores") that may execute instructions 702 contemporaneously. Although FIG. 7 shows multiple processors 704, the machine 700 may include a single processor with a single core, a single processor with multiple cores (e.g., a multi-core processor), multiple processors with a single core, multiple processors with multiple cores, or any combination thereof.

The memory 706 (e.g., a main memory or other memory storage) and the storage unit 708 are both accessible to the processors 704 such as via the bus 712. The memory 706 and the storage unit 708 store the instructions 702. The instructions 702 may also reside, completely or partially, within the memory 706, within the storage unit 708, within at least one of the processors 704 (e.g., within the processor's cache memory), or any suitable combination thereof, during execution thereof by the machine 700. Accordingly, the memory 706, the storage unit 708, and the memory of the processors 704 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 702. The term "machine-readable medium" shall also be taken to include any medium, or combination of multiple media, that is capable of storing instructions (e.g., instructions 702) for execution by a machine (e.g., machine 700), such that the instructions, when executed by one or more processors of the machine (e.g., processors 704), cause the machine to perform one or more operations that makes use of one or more of the methodologies described herein (e.g., the method 200, 300, or 400). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 710 may include a wide variety of components to receive input, provide output, produce output, transmit information, exchange information, capture measurements, and so on. The specific I/O components 710 that are included in a particular machine 700 will depend on the type of the machine 700. For example, portable machines such as mobile phones will likely include a touch input device or other such input mechanisms, while a headless server machine will likely not include such a touch input device. It will be appreciated that the I/O components 710 may include many other components that are not specifically shown in FIG. 7. The I/O components 710 are grouped according to functionality merely for simplifying the following discussion and the grouping is in no way limiting. In various embodiments, the I/O components 710 may include input components 718 and output components 720. The input components 718 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components, and the like. The output components 720 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 710 may include communication components 722 operable to couple the machine 700 to a network 724 or devices 726 via a coupling 728 and a coupling 730 respectively. For example, the communication components 722 may include a network interface component or another suitable device to interface with the network 724. In further examples, the communication components 722 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 726 may be another machine or any of a wide variety of peripheral devices. According to various embodiments, the communication components 722 can include a transceiver described herein, a receiver described herein, or both.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A system comprising:
   a first physical layer device configured to communicate data with a second physical layer device over a data transmission medium using Audio Video Transport Protocol (AVTP), the first physical layer device being further configured to perform operations comprising:
   accessing a first data packet defined by a first data standard; and
   generating, based on the first data packet, a first AVTP data packet that comprises a first AVTP common stream data header and a first payload portion, the generating the first AVTP data packet comprising mapping the first data packet to the first AVTP data packet by:
      setting a subtype field of the first AVTP common stream data header to a vendor specific format subtype, the first payload portion comprising a stream data payload portion associated with the vendor specific format subtype;
      setting a first plurality of fields stored at a predetermined location in the first payload portion, the setting the first plurality of fields comprising:
         setting, in the first plurality of fields, a first indicator field to specify that data of the first data standard is being encapsulated by the first AVTP data packet; and
         setting, in the first plurality of fields, a first set of other fields based on data from at least one field from the first data packet, the at least one field defined by the first data standard; and
      storing first payload data from the first data packet to the first payload portion.

2. The system of claim 1, wherein in the first payload portion, the first set of other fields is stored after the first indicator field in the first payload portion.

3. The system of claim 1, wherein in the first payload portion, the first payload data is stored after the first plurality of fields.

4. The system of claim 1, wherein the first data standard comprises a Mobile Industry Processor Interface (MIPI) Camera Serial Interface (CSI) standard.

5. The system of claim 4, wherein the first set of other fields comprises at least one of: a start frame field; an end frame field; a frame count field; a line start field; line end field; a line number field; or a fragment information field.

6. The system of claim 4, wherein the generating first AVTP data packet further comprises mapping the first data packet to the first AVTP data packet by:
   setting a stream identifier field in the first AVTP common stream data header such that the stream identifier field comprises a media access control (MAC) address associated with the first physical layer device and a unique identifier.

7. The system of claim 6, wherein the unique identifier comprises a virtual channel data and data type data, the virtual channel data and the data type data being from the first data packet.

8. The system of claim 4, wherein the generating first AVTP data packet further comprises mapping the first data packet to the first AVTP data packet by:
   setting, in the first AVTP common stream data header: a stream identifier with a stream identifier value; a stream identifier valid field with a valid value; a sequence number field with a sequence number associated with the stream identifier value; an timestamp field; a timestamp valid field with a valid value; and a stream data length field based on the first indicator field, the first plurality of fields, and the first payload data stored in the first payload portion of the first AVTP data packet.

9. The system of claim 1, wherein the first data standard comprises one of a Mobile Industry Processor Interface (MIPI) Camera Serial Interface (CSI)-2 standard or a Mobile Industry Processor Interface (MIPI) Camera Serial Interface (CSI)-3 standard.

10. The system of claim 1, wherein the first data standard comprises one of an Inter-Integrated Circuit (I2C) standard or an I3C standard.

11. The system of claim 10, wherein the first set of other fields comprises at least one of: a device address field; a memory address field; a command type field; command length field; or error or interrupt field.

12. The system of claim 1, wherein the operations further comprise:
receiving a second AVTP data packet from the second physical layer device, the second AVTP data packet comprising a second AVTP common stream data header and a second payload portion, a subtype field of the second AVTP common stream data header being set to the vendor specific format subtype, the second payload portion comprising a second plurality of fields that is stored at a predetermined location in the second payload portion, the second plurality of fields comprising a second indicator field to specify that data of a second data standard is being encapsulated by the second AVTP data packet.

13. The system of claim 12, wherein the operations further comprise:
in response to receiving the second AVTP data packet, generating, based on the second AVTP data packet, a second data packet of the second data standard, and the generating the second data packet based on the second AVTP data packet comprises mapping the second AVTP data packet to the second data packet by:
accessing, from the second payload portion, a second set of other fields that store information relating to the second data standard;
storing data from the second set of other fields to the second data packet;
accessing, from the second payload portion, second payload data for the second data packet; and
storing the second payload data in the second data packet.

14. The system of claim 1, wherein the operations further comprise:
receiving a request to reconfigure the first physical layer device such that the first physical layer device:
foregoes the generating the first AVTP data packet based on the first data packet; and
generates the first AVTP data packet by setting the first AVTP data packet to a subtype corresponding to the first data standard, and by mapping data from one or more fields of the first data packet to one or more fields of the first AVTP data packet.

15. A system comprising:
a first physical layer device configured to communicate data with a second physical layer device over a data transmission medium using Audio Video Transport Protocol (AVTP), the first physical layer device being further configured to perform operations comprising:
accessing a first data packet defined by a first data standard; and
generating, based on the first data packet, a first AVTP data packet that comprises a first AVTP common stream data header and a first payload portion, the generating the first AVTP data packet comprising mapping the first data packet to the first AVTP data packet by:
setting a subtype field of the first AVTP common stream data header to a Serial Digital Interface video format subtype, the first payload portion comprising a video data payload portion associated with the Serial Digital Interface video format subtype;
setting a first plurality of fields stored at a predetermined location in the first payload portion, the setting the first plurality of fields comprising:
setting, in the first plurality of fields, a first indicator field to specify that data of the first data standard is being encapsulated by the first AVTP data packet; and
setting, in the first plurality of fields, a first set of other fields based on data from at least one field from the first data packet, the at least one field defined by the first data standard; and
storing first payload data from the first data packet to the first payload portion.

16. The system of claim 15, wherein the first data standard comprises one of a Mobile Industry Processor Interface (MIPI) Camera Serial Interface (CSI)-2 standard, a Mobile Industry Processor Interface (MIPI) Camera Serial Interface (CSI)-3 standard, or an I3C standard.

17. The system of claim 16, wherein the generating first AVTP data packet further comprises mapping the first data packet to the first AVTP data packet by:
setting a format field in the first AVTP common stream data header to a value associated with SVF_USER as defined by an Institute of Electrical and Electronics Engineers (IEEE) 1722 standard.

18. The system of claim 16, wherein the generating first AVTP data packet further comprises mapping the first data packet to the first AVTP data packet by:
setting, in the first AVTP common stream data header: an end frame field based on frame end data from the first data packet; an intra-line sequence number based on line start data from the first data packet; a line number field to specify a current video frame; and a stream data length field to a fixed size based on the first indicator field, the first plurality of fields, and the first payload data stored in the first payload portion of the first AVTP data packet.

19. The system of claim 15, wherein the operations further comprise:
receiving a request to reconfigure the first physical layer device such that the first physical layer device:
foregoes the generating the first AVTP data packet based on the first data packet; and
generates the first AVTP data packet by setting the first AVTP data packet to a subtype corresponding to the first data standard, and by mapping data from one or more fields of the first data packet to one or more fields of the first AVTP data packet.

20. A method comprising:
accessing, a first physical layer device, a first data packet defined by a first data standard, the first physical layer device being configured to communicate data with a second physical layer device over a data transmission medium using Audio Video Transport Protocol (AVTP); and
generating, by the first physical layer device and based on the first data packet, a first AVTP data packet that comprises a first AVTP common stream data header and a first payload portion, the generating the first AVTP data packet comprising mapping the first data packet to the first AVTP data packet by:
    setting a subtype field of the first AVTP common stream data header to a vendor specific format subtype, the first payload portion comprising a stream data payload portion associated with the vendor specific format subtype;
    setting a first plurality of fields stored at a predetermined location in the first payload portion, the setting the first plurality of fields comprising:
        setting, in the first plurality of fields, a first indicator field to specify that data of the first data standard is being encapsulated by the first AVTP data packet; and
        setting, in the first plurality of fields, a first set of other fields based on data from at least one field from the first data packet, the at least one field defined by the first data standard; and
    storing first payload data from the first data packet to the first payload portion.

* * * * *